UNITED STATES PATENT OFFICE.

ARTHUR R. BULLOCK, OF LAKEWOOD, OHIO.

ELECTROLYTIC PROCESS FOR THE TREATMENT OF CARBON.

1,378,834.     Specification of Letters Patent.     Patented May 24, 1921.

No Drawing. Original application filed October 2, 1914, Serial No. 864,643. Divided and this application filed August 29, 1919. Serial No. 320,710.

*To all whom it may concern:*

Be it known that I, ARTHUR R. BULLOCK, a citizen of the United States, residing at Lakewood, in the county of Cuyahoga and State of Ohio, have invented a certain new and useful Improvement in Electrolytic Processes for the Treatment of Carbon, of which the following is a full, clear, and exact description.

This invention relates to a process for the electrolytic treatment of carbon or material containing carbon whereby carbon when utilized as an anode electrode in an electrolytic cell under suitable current conditions is by the electrolytic action, gradually removed from the electrode and incorporated as a part of the electrolyte, the carbon being to all intents and purposes in solution and may be recovered from the solution by chemical methods or by a process of plating.

This application is in part a division of my prior application Serial No. 864,643 filed Oct. 2, 1914, which eventuated in Patent 1,314,632.

I have discovered that under certain conditions which may be controlled, a carbon anode when immersed in a suitable electrolyte such as sodium sulfate, will under the action of the electric current become reduced in mass and weight, the carbon being incorporated as a part of the electrolyte in dissolved or substantially dissolved condition or under certain other conditions the carbon from the anode electrode will form a precipitate in the liquid of the electrolyte which may be subsequently recovered. I am aware that it is a fair question to be asked, whether the carbon which disappears from the anode electrode really forms a solution in the liquid of the electrolyte. Perchance the carbon unites with the electrolyte to form a different chemical substance. This I am not able to determine at the present time but it may be said that the electrolyte when the current is caused to flow for a period of time under certain conditions of operations remains clear so far as any precipitate is concerned except where the carbon of the anode contains impurities such as silica which are not acted upon, which impurities will be precipitated to the bottom of the electrolytic cell unless precautions be taken to prevent such particles from becoming mechanically detached from the anode. This may be accomplished by placing the carbon anode in a porous cell or by wrapping the anode in suitable porous material such as filter paper and cloth.

In order to explain in concrete manner, the operation of the process, the following may be given:

An electrolyte is made by dissolving chemically pure sodium sulfate in distilled water, preferably although not necessarily the solution is prepared as a substantially saturated solution. A carbon anode is immersed in the solution and a cathode is also immersed in the solution. I have successfully used as the anode various forms of carbon, such as carbon blocks or masses, chunks of coke as well as Atcheson graphite.

The cathode may be a substance which will function in connection with the carbon anode as for instance the cathode may be of platinum or of any other suitable material.

The current required is comparatively of low value and I have produced the electrolyte action with the current as low as one-eighth of an ampere although better results are obtained where the current value is one-half of an ampere for six square inches of anode surface and with substantially the same area at the cathode. Good results have been obtained when the voltage is regulated to be in the neighborhood of three and one-half to four volts.

The electrolyte may be made slightly acid by the use of a small quantity of sulfuric acid although this is not necessary in order to secure the electrolytic action as will be later described.

If the electrolyte is acidified as above described and the current caused to pass between the electrodes, the color of the electrolyte changes as the process continues, assuming a brownish or reddish brown color which becomes darker and more dense as the flow of current continues.

While the electrolyte changes color as the process continues, the liquid remains perfectly clear so far as any precipitate or any matter in suspension is concerned, particularly where care is taken to wrap or envelop the carbon anode by a porous container.

Carbon may be recovered from the electrolyte prepared as above described by immersing in the solution a suitable anode such as of carbon and a metallic cathode such as platinum. Under these conditions when a suitable current is caused to pass through the electrolyte under conditions before described, there is deposited upon the cathode a layer of material which upon tests I have found to be carbon. In other words, the carbon plates out of the electrolyte which is prepared as before described.

Furthermore, I have found that if the electrolyte solution be evaporated nearly to dryness in a suitable receptacle and then there be added a quantity of distilled water, a dense black powder is produced. This powder upon analysis is found to be carbon.

From the above results I believe that I am justified in saying that the carbon in the electrolyte is in dissolved or substantially dissolved condition. It is not in colloidal condition, the solution is a distinct one and where, as in the present instance, the carbon which is incorporated in the electrolyte responds to an electroplating action as well as to chemical reactions, the condition is not markedly colloidal, but is very near the solution point if it is not an actual solution and hence may be accurately described as a solution or substantially a solution.

If instead of having the sodium sulfate electrolyte slightly acid, the solution be made to be slightly alkaline, and in proceeding with the process, the carbon anode be suitably wrapped or enveloped by a porous container so that the electrolyte does not become contaminated by particles sloughing off of carbon anode and passing a suitable current through the electrolytic cell as before described, a precipitate is formed in the electrolyte which precipitate is black and bulky. It should be borne in mind that this precipitate is not merely the mechanical disintegration of the carbon anode for precaution is taken to wrap the anode to prevent such an occurrence; therefore the precipitate which appears in the electrolyte must have detached itself from the anode and passed through the wrapping. It is my opinion that the carbon is in the first instance dissolved from the anode in which condition it passes through the wrapper or container for the electrode and subsequently forms a precipitate in the general body of the electrolyte. The electrolyte containing the carbon in its dissolved or substantially dissolved condition may be subsequently treated in a variety of ways with different results and for one purpose I have treated electrolyte to recover carbon in exceedingly finely divided condition.

While I have described my process in connection with the production of finely divided carbon, I do not wish to limit myself to this particular result for I believe that my discovery of the fact that carbon may by an electrolytic process, be caused to pass from anode electrode to the electrolyte in dissolved or substantially dissolved condition is a new discovery.

Having described my invention, I claim:

1. The process of treating carbon which consists in immersing a carbon anode electrode and a cathode electrode in an electrolytic bath consisting of sodium sulfate, passing an electric current from the anode to the cathode, regulating the amperage and voltage of said current so as to cause the carbon to be removed from the anode and to pass to the electrolyte.

2. The process of treating carbon which consists in immersing a carbon anode electrode and a cathode electrode in an electrolytic bath, consisting of sodium sulfate passing an electric current of suitable voltage and amperage from the anode to the cathode and regulating said current to cause the carbon to be dissolved from the anode and pass in solution substantially in solution in the electrolyte.

3. The process of treating carbon which consists in immersing a carbon anode electrode and a cathode electrode in an electrolyte containing a substance having an effect upon carbon similar to sodium sulfate when an electrolytic current is caused to pass between the anode and cathode and passing an electric current of regulated voltage and amperage so as to cause the carbon to pass from the anode to the electrolyte.

4. The process of treating carbon which consists in immersing a carbon anode electrode in an electrolytic bath consisting of dissolved sodium sulfate, having the electrolyte in acidified condition, passing an electric current from the anode to the cathode and regulating the amperage and voltage of said current so as to cause the carbon to be removed from the anode and to pass to the electrolyte.

5. The process of treating carbon which consists in immersing a carbon anode electrode and a cathode electrode in an electrolytic bath, comprising dissolved sodium sulfate having the electrolyte in acidified condition, passing an electric current from the anode to the cathode and regulating the amperage and voltage of said current so as to cause the carbon to be dissolved from the anode and pass in solution or substantially in solution to the electrolyte.

6. As a new product of manufacture, a solution containing carbon in dissolved or substantially dissolved condition.

7. As a new product of manufacture, a solution of sodium sulfate containing carbon in dissolved or substantially dissolved condition.

In testimony whereof, I hereunto affix my signature.

ARTHUR R. BULLOCK.